(12) United States Patent
Kouki

(10) Patent No.: US 7,330,500 B2
(45) Date of Patent: Feb. 12, 2008

(54) ADJUSTABLE ELECTRONIC DUPLEXER

(75) Inventor: Ammar B. Kouki, Montreal (CA)

(73) Assignee: Socovar S.E.C., Montréal, Québec (CA)

( * ) Notice: Subject to any disclaimer, the term of this patent is extended or adjusted under 35 U.S.C. 154(b) by 706 days.

(21) Appl. No.: 10/314,414

(22) Filed: Dec. 9, 2002

(65) Prior Publication Data

US 2003/0174763 A1    Sep. 18, 2003

(51) Int. Cl.
*H04B 1/38* (2006.01)
(52) U.S. Cl. .............. 375/219; 370/276; 370/286; 370/289; 379/3; 379/406.01; 379/406.05; 398/41; 455/570; 704/E21.002
(58) Field of Classification Search ........ 330/151; 343/895; 455/22, 63.1, 78, 84, 296, 570; 375/247
See application file for complete search history.

(56) References Cited

U.S. PATENT DOCUMENTS

| | | | | |
|---|---|---|---|---|
| 4,320,523 A | * | 3/1982 | Horikawa et al. | 375/350 |
| 4,972,436 A | * | 11/1990 | Halim et al. | 375/247 |
| 5,574,978 A | * | 11/1996 | Talwar et al. | 455/63.1 |
| 5,729,829 A | * | 3/1998 | Talwar et al. | 455/63.1 |

* cited by examiner

*Primary Examiner*—David C. Payne
*Assistant Examiner*—Adolf DSouza
(74) *Attorney, Agent, or Firm*—Ogilvy Renault, LLP

(57) ABSTRACT

A duplexer for a communication device having a transmission unit, a reception unit and a shared antenna is disclosed. The duplexer comprises a first signal path between the transmission unit and the reception unit, the first signal path comprises a filter unit filtering the reception signal, the filtering unit provides a filtered signal to the reception unit. The duplexer further comprises a second signal path between the transmission unit and the reception unit. The second signal path comprises a cancellation unit which receives a sample of the transmission signal and produces a compensation signal. The injection of the compensation signal to the first signal path reduces the leakage signal, thereby producing a substantially leakage-free reception signal.

14 Claims, 7 Drawing Sheets

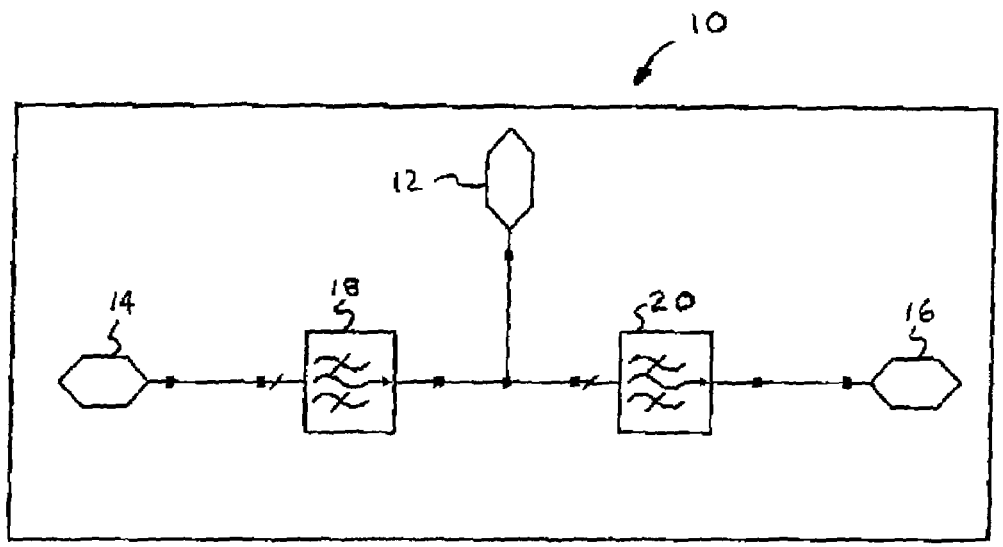
Prior Art    Fig. 1
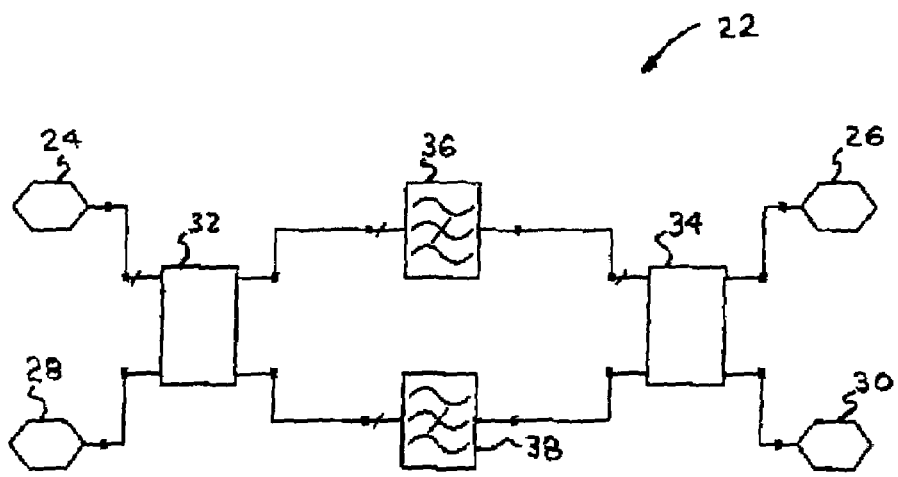
Prior Art    Fig. 2

ADJUSTABLE ELECTRONIC DUPLEXER

FIELD OF THE INVENTION

This invention relates to components for telecommunications devices. More particularly, the invention relates to duplexers between transmitters, receivers and antennas.

BACKGROUND OF THE INVENTION

The duplexer as it is known today gained significance around 1988. Before then, it was used for radars in the 50s, 60s and 70s. Some even contained gases. Today, the majority of the duplexers use dielectric materials having a quality factor, which results in a low insertion loss. They also use ceramic materials with a high permittivity in order to miniaturize the passive circuits.

Over the years, the duplexer has evolved as follows:

1953—Use of duplexers with cavities and in the configuration shown in FIG. 1. The cavities were in fact band-pass filters, which could be adjusted mechanically.

1956—The duplexers were made from two hybrids and two tubes. The two tubes are filled with gas and play the role of a switch. These duplexers could not send signals and receive at the same time; they were therefore "half-duplex" applications use mostly in military radars. Twenty years later, no major change had been brought to the duplexers until the appearance of large cellular systems, which required companies to research ways of miniaturizing and optimizing duplexer performance.

1988—Cellular technology requirements increasingly called for more powerful and smaller components. SAW filters (Surface Acoustic Wave) revolutionized this need. These filters convert electromagnetic energy into SAW energy. SAW filters promised to considerably reduce the volume of the duplexers given that they are very small and moreover, they can support higher powers (2 Watts).

1995—Use of SAW filters in GSM cellular band handsets, with the advantage of a low insertion loss and a small volume that could be produced in large volumes. They also made it possible to avoid the use of traditional components: coils, capacitors, etc.

1999—Use of LTCC (Low-Temperature Co-Fired Multi-layer Ceramic) technology. This technology made it possible to obtain a smaller duplexer. This duplexer used planar filters in "stripline" with a high permitivity and a volume of 30% compared to the cast solid duplexer, while having the same performance.

2000—Use of two hybrids and two band-stop filters in a chamber filled with liquid nitrogen at a temperature of 80 degrees Kelvin thus offering a low insertion loss by superconductivity. The two band-stop filters were adjusted to reject the receiver frequencies. By using a substrate of LAO ($LaAlO_3$), this duplexer gives a loss by insertion of less than 1.15 dB and all insulation higher than 35 dB.

$$\text{Isolation} = S_{Tx-Rx} = \frac{b_{2B}}{a_{1A}} = (S_{21} \cdot S_{21} + S_{24} \cdot S_{31}) \cdot e^{-j\phi}$$

2001—The latest technology of duplexers uses FBAR (Miniature Bulk Acoustic Resonator) technology by Agilent Technologies. This technology makes it possible for the duplexer to occupy less than 20% of the volume of conventional ceramic duplexers.

With the increase in the number of cellular users and the great diversity of their needs, mobile communication has never progressed so quickly. Thousands of dollars are invested in research each year to optimize, miniaturize and find new lower cost solutions in order to fill the needs of an extremely profitable market. Most of the research is therefore centered on increasingly powerful, small an inexpensive electronic parts.

Considering the need to miniaturize the handset components, it is normal to focus on that which takes the largest volume: the duplexer. The duplexer is fundamentally a passive component installed in most full-duplex cellular system. It plays the role of interface between the transmitter, the receiver and the antenna. The ultimate objective of the duplexer is to convey the power coming from the transmitter towards the antenna and to convey the power coming from the antenna towards the receiver. Ideally, no power must pass between the transmitter and the receiver and vice versa. To meet this requirement, the duplexers use analog filters. Thus, in the last twenty years researchers have especially concentrated their effort on the discovery of new filter technologies and not in the development of various topologies of duplexers.

Thus, there is a need in the industry for better performing and cheaper duplexers.

SUMMARY OF THE INVENTION

It is an object of the invention to reduce the interference caused by a leakage signal from a transmission unit to a reception unit in a communication system or device sharing an antenna for transmission and reception.

According to an embodiment, the invention provides a duplexer for a communication device having a transmission unit, a reception unit and a shared antenna. The shared antenna transmits a portion of a transmission signal provided by the transmission unit and receiving a reception signal. The duplexer generates a leakage signal from the transmission unit toward the reception unit. The leakage signal being added to the reception signal. The duplexer comprises a first signal path between the transmission unit and the reception unit. The first signal path comprises a filter unit filtering the reception signal. The filtering unit provides a filtered signal to the reception unit. The duplexer further comprises a second signal path between the transmission unit and the reception unit. The second signal path comprises a cancellation unit which receives a sample of the transmission signal and produces a compensation signal. The injection of the compensation signal to the first signal path substantially reduces the leakage signal, thereby producing a substantially leakage-free reception signal.

The cancellation unit may include an attenuator for attenuating the sample of the transmission signal to an amplitude substantially equal to the amplitude of the leakage signal, and phase-converter for shifting the phase of the transmission signal substantially 180-degree relative to the phase of the leakage signal.

The duplexer may further comprise a third signal path between the first signal path and the compensation unit. The third signal path comprises a control unit which receives a sample of the substantially leakage-free reception signal and produces the control voltage for input to the compensation unit.

According to another embodiment, the invention provides, in a telecommunication unit having a shared antenna, a transmission unit and a reception unit, a method for canceling the interference generated by the transmission unit in the reception unit. The method comprises: acquiring a sample of a transmission signal provided by the transmission unit; computing a compensation signal having an amplitude substantially equal to the amplitude of the leakage signal received by the reception unit and a phase substantially 180-degree shifted from the phase of the leakage signal received by the reception unit; and injecting the compensation signal in the reception unit for substantially reducing the leakage signal, thereby producing a substantially leakage-free reception signal.

According to yet another embodiment, the invention provides, in a telecommunication unit having a shared antenna, a transmission unit and a reception unit, a method for transmitting a portion of a first signal provided by the transmission unit and receiving a second signal using the reception unit. The transmission unit generates a leakage signal from the transmission unit toward the reception unit. The leakage signal being added to the second signal. The method comprises: transmitting the portion of the first signal provided by the transmission unit; acquiring a sample of the first signal provided by the transmission unit; computing a compensation signal having an amplitude substantially equal to the amplitude of the leakage signal received by the reception unit and a phase substantially 180-degree shifted from the phase of the leakage signal received by the reception unit; receiving the second signal; and injecting the compensation signal into the second signal for substantially reducing the leakage signal, thereby producing a substantially leakage-free reception signal.

BRIEF DESCRIPTION OF THE DRAWINGS

FIG. 1 is a block diagram of a conventional prior art duplexer;

FIG. 2 is a block diagram of another conventional prior art duplexer;

Figure 3:
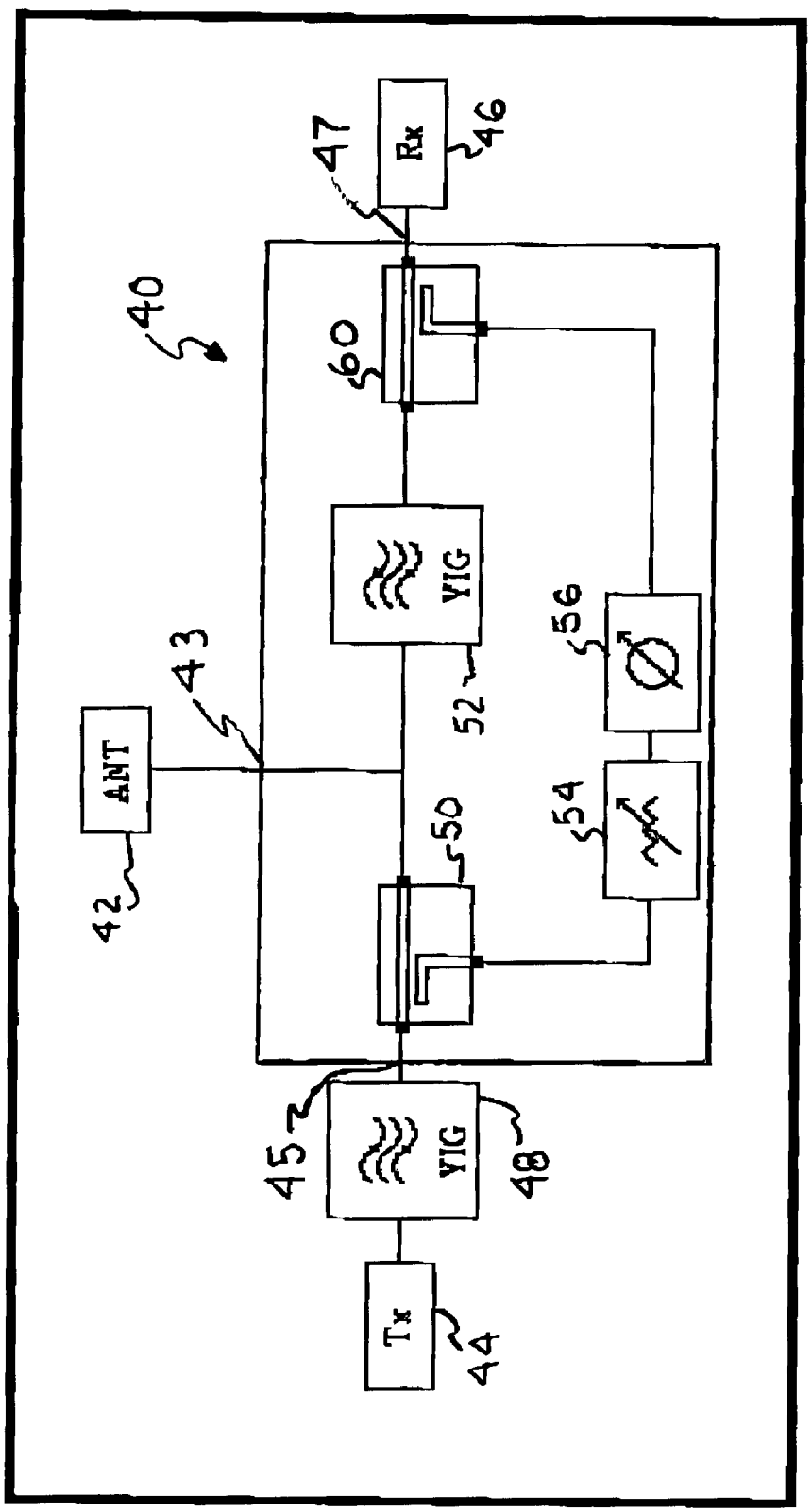
FIG. 3 is a block diagram of a communication system comprising a duplexer built in accordance with an embodiment of the invention.

DESCRIPTION OF THE PREFERRED
EMBODIMENTS OF THE INVENTION

Today's standard duplexer 10 is shown in FIG. 1. It is a passive RF component with three ports: a transmitter port 14, a receiver port 16 and the antenna port 12. Two band-pass filters 18 and 20 are necessary in order to isolate the transmitter port 14 and the receiver port 16. In theory, no power coming from the transmitter 14 port must pass through to the receive port 16. The frequency of the transmitter is offset from that of the receiver Another type of duplexer 20 is shown in FIG. 2. Duplexer 22 uses two hybrids 32 and 34 and two band-stop filters 36 and 38 in a chamber filled with liquid nitrogen at a temperature of 80 degrees Kelvin thus offering a low insertion loss by superconductivity. Duplexer 22 also includes a transmitter port 24, a receiver port 26, an antenna port 30, and a match load port 28. The two band-stop filters 36 and 38 are adjusted to reject the receiver frequencies. By using a substrate of LAO (LaAlO$_3$), this duplexer gives an insertion loss of less than 115 dB and an insulation greater than 35 dB.

An ideal duplexer has the following characteristics: infinite return loss at each port (transmitter, receiver, and antenna); no transmission loss between the Tx port and the antenna port, no transmission loss between the antenna port and the receiver port; and complete insulation between the Tx port and the Rx port.

It is important to define the following terms:

"Insertion Loss Tx-Ant" is the loss in dB between the Tx port and the antenna port.

"Insertion Loss Ant-Rx" is the loss in dB between the antenna port and the Rx port.

"Insulation" is the ratio of power in dB which is propagated from the Tx port to the Rx port as well as from the Rx port to the Tx port.

"Tx band" is the frequency band, which is less than 3 dB down when compared to the peak of the Tx-Ant transmission curve.

"Rx band" is the frequency band, which is less than 3 dB down when compared to the peak of the Ant-Rx transmission curve.

"Maximum Power" is the power in dBm or Watts, which the Tx port of the duplexer can support towards the antenna.

"SWR or Return Loss" corresponds to the rate of adaptation of the impedance of the ports.

"Ripple" is the variation of undulation in dB on the Tx or Rx band of operation.

"Leakage signal" is the difference between the transmission signal provided by the transmission unit and the portion of the transmission signal transmitted by the antenna.

All of today's miniature duplexers offer low insulation (in the order of 30 dB) and the frequency bands allocated to the transmitter and receiver are fixed. Duplexers with cavities offer low insertion loss and have excellent insulation in the order of 80 dB or more. On the other hand, these duplexers are large and must be adjusted mechanically In order to deal with these problem, a new topology the new topology shown in the exemplary embodiment of FIG. 3. The new topology adds a feed forward loop to the standard duplexer 10 of FIG. 1 to produce duplexer 40.

Duplexer 40 has a transmitter port 45, a receiver port 47 and an antenna port 43. Duplexer 40 shown in FIG. 3 only has one YIG filter 52. An additional YIG filter is shown at the input of the duplexer 40. A "YIG filter" is a band-pass filter controlled by a power source and has a very wide frequency range. A YIG filter is relatively cheap. Unfortunately, the insertion loss of a YIG filter is relatively high, i.e., approximately 3 to 6 dB.

The use of directional couplers 50 and 60, an attenuator 54 and phase-converter 56 makes it possible to increase the insulation between transmitter 44 and receiver 46. Antenna 42 is also shown in FIG. 3. The lower loop (second signal path) samples the transmitter signal through a coupler 50, attenuates it (with attenuator 54) to the same power as the signal on the output side of the YIG filter 52, phase reverses it (with phase-converter 56) to obtain 180 degrees difference between the two signals. The lower loop therefore produces a compensation signal. The compensation signal is then injection in the upper loop (the first signal path) through coupler 60. In an ideal duplexer the leakage signal would be completely removed at the Rx port 47.

In order to remove the leakage signal, it is important to understand some theory about how to increase insulation by tens of dBs.

$$R(dB) = 10 \cdot \log\left(\left|10^{\frac{\Delta A(dB)}{10}} + 1 - 2 \cdot 10^{\frac{\Delta A(dB)}{20}} \cdot \cos(\phi)\right|\right)$$

where ΔA is the difference in amplitude between the two signals in dB

R(dB) is the level of suppression

φ is the difference in phase between the two signals expressed in degrees

To obtain perfect suppression, three conditions are needed:
1— The amplitudes must be equal;
2— The two signals must be 180 degrees out-of-phase; and
3— The two signals must have the same propagation delay.

Figure 4:
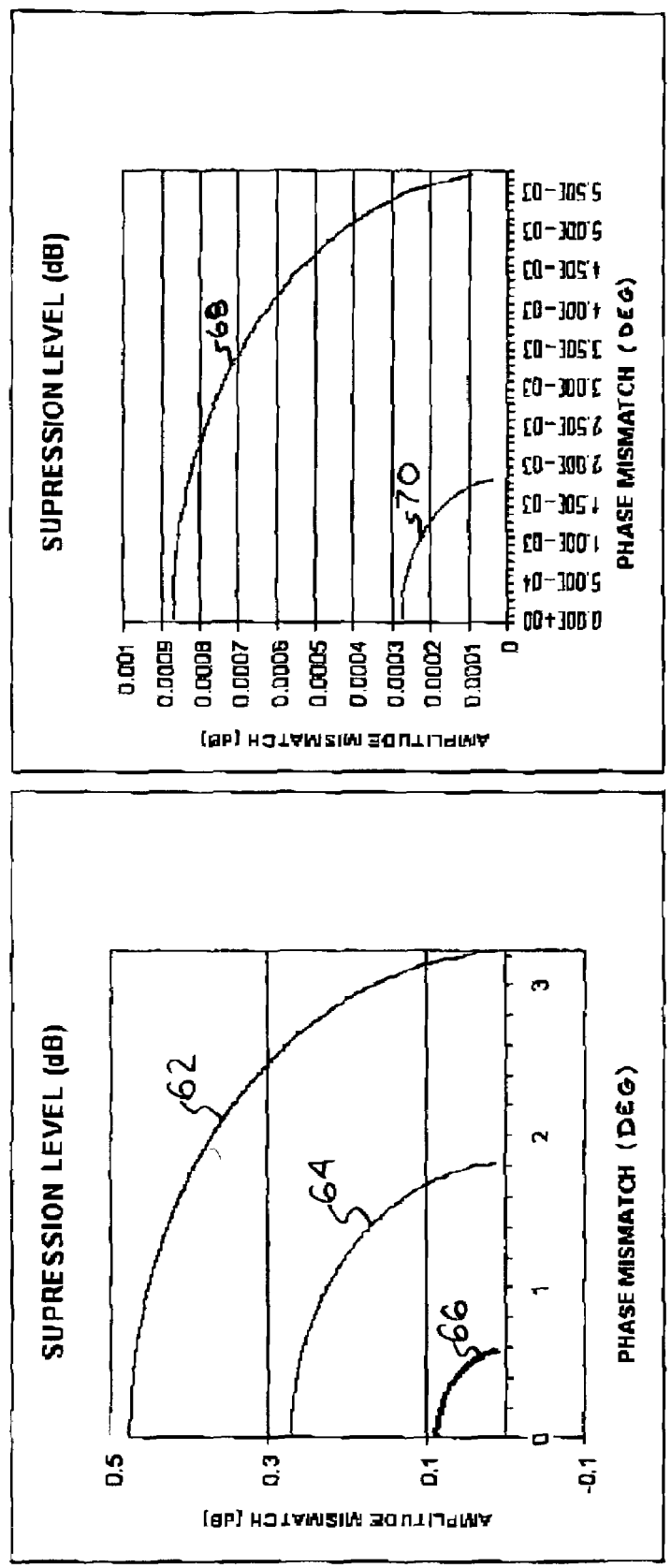
FIG. 4 is a chart showing the amplitude and phase mismatch requirements to achieve various suppression levels of the signal transmitted from the transmitter to the receiver.

Persons skilled in the art will understand that a high degree of accuracy is required in order to obtain high levels of suppression. FIG. 4 shows various suppression level curves and the phase mismatch and amplitude mismatch requirements to obtain each suppression level. Shown suppression levels are as follows: 25 dB on curve 62; 30 dB on curve 64, 40 dB on curve 66. 80 dB on curve 5868 and 90 dB on curve 70. In an example, to reach a suppression level of 40 dB (curve 66), it is necessary that the difference in amplitude be equal to 0.06 dB and of 0.4 degrees between the two signals. Suppression levels of 80 dB or more (curves 68 and 70) would be interesting, but the required precision is difficult to achieve in practice. Considering that a signal Is never repetitive (a ODMA modulated signal, for example), propagation delay of the Iwo signal of the two paths should be as close to equal as possible (substantially equal). If this condition is not met, good suppression will not be achieved for the simple reason that the signals will be out-of-phase at receiver 46.

Figure 5:
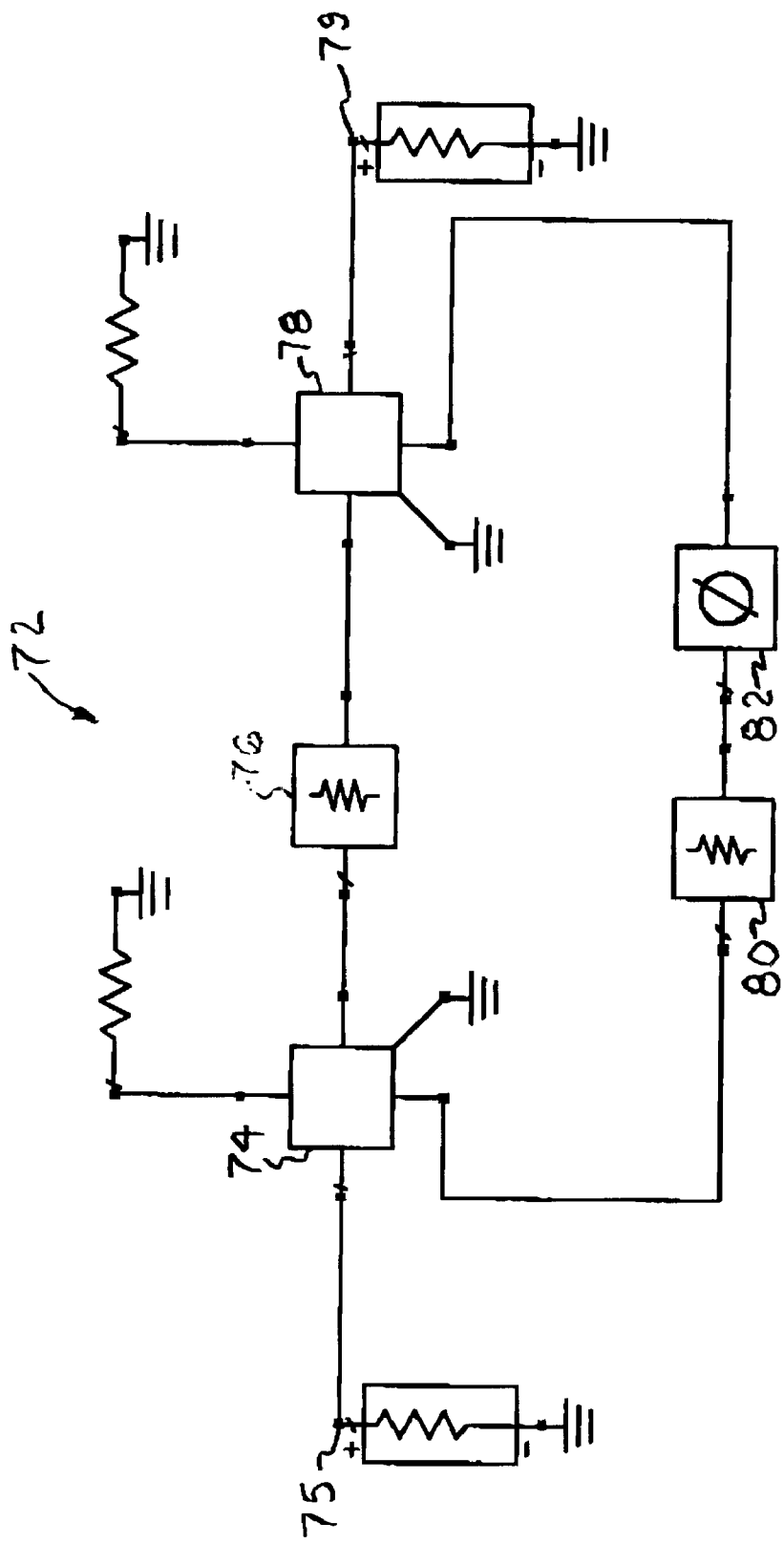
FIG. 5 is a block diagram of an ideal suppression circuit used for computer simulations.
Figure 6A:
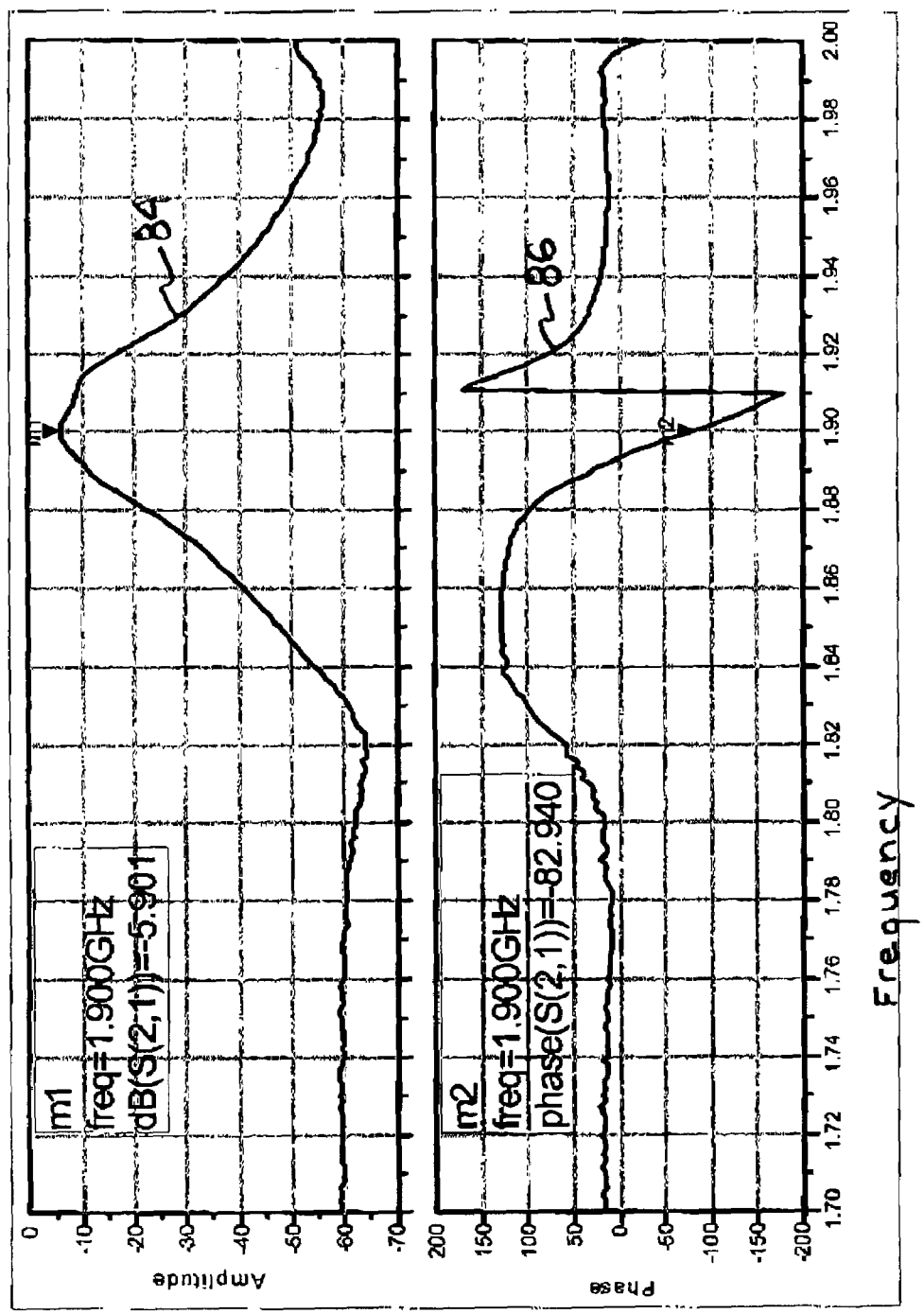
FIGS. 6A and 6B are charts showing exemplary parameters of a YIG filter used in an embodiment of the invention.
Figure 6B:
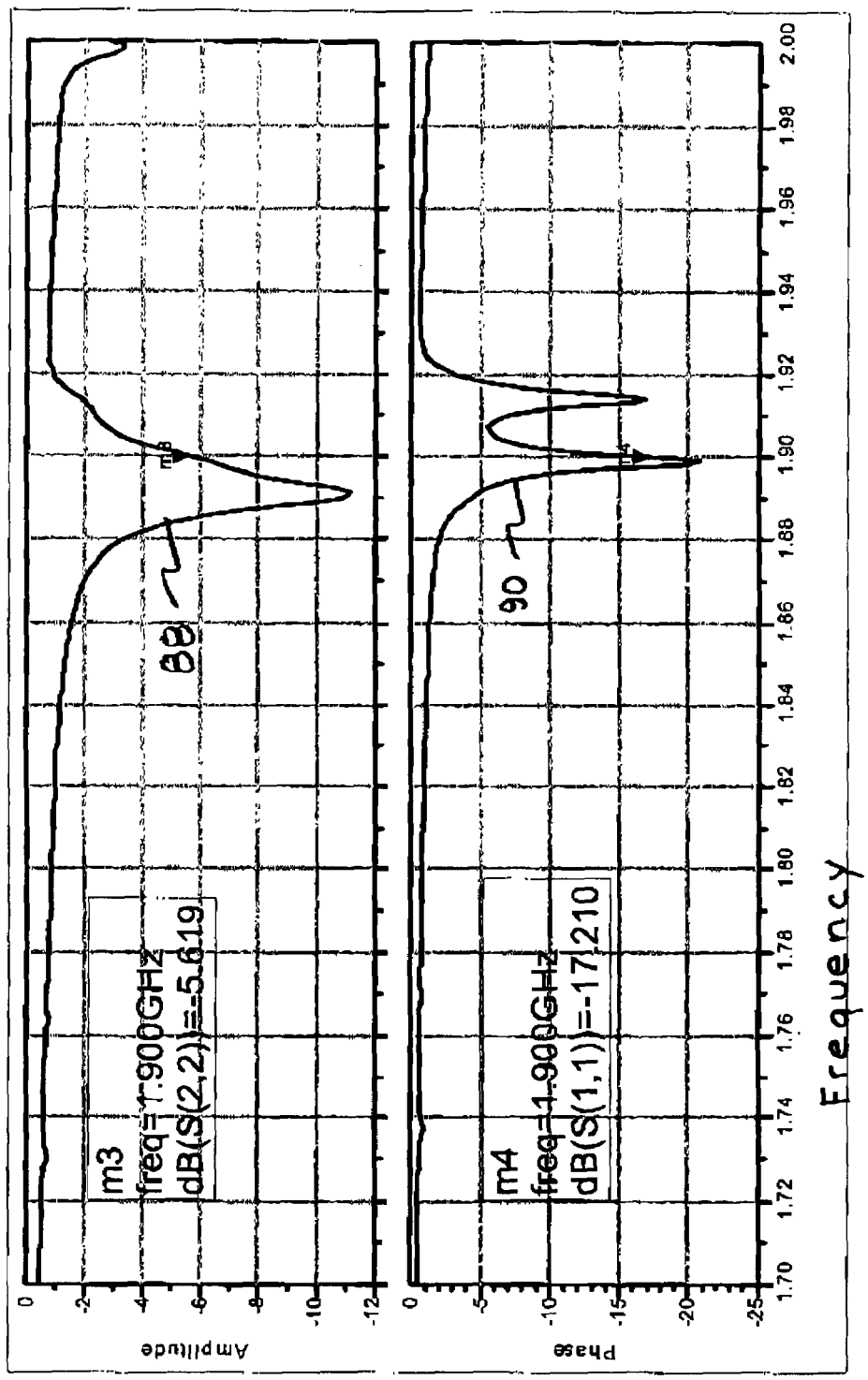

The simulation circuit 72 shown in FIG. 5 was used in order to demonstrate the feed forward principle and the ability to use the duplexer 40 in the 1.7 GHz to 20 Hz range. A 50 dB attenuator 76 plays the role of a band-pass filter. The signal coming from port 1 will be attenuated by 50 dB in the upper path, without any phase variation. There is no additional loss since the couplers 74 and 78 are ideal, thereby presenting zero insertion loss Given that the couplers 74 and 78 offer a coupling coefficient of 10 dB without any change in phase, the signal traveling on the lower path will be attenuated by 50 dB by attenuator 80, and be subjected to a 180 degree phase shift (by phase-shifter 82) compared to the signal on the upper loop. The superposition of two the upper and lower loop signal by coupler 78 will result in suppression of the undesirable signal (leakage signal) from port 75. FIGS. 6A and 6B show characteristics for an exemplary YIG filter.

In order to maximize removal of the undesirable Tx signal (leakage signal) to the port 79, it is necessary to work in a zone that is stable in phase and amplitude. YIG filters normally have a weak return loss at their resonance frequency which results in a good level of insertion loss As shown in FIG. 6A (curves 84 and 86), the stable zone is around 1.75 GHz. As shown in FIG. 6B (curve 88 and 90), the exemplary YIG filter has a low return loss at its resonance frequency (around 1.9 GHz) thereby providing good insertion loss.

Persons skilled in the art will know that attenuator and phase converter characteristics vary with their input voltages. Also, attenuator and phase converter characteristics may not be constant over a given operating frequency range (e.g., 1.7 GHz to 2.0 GHz). It may therefore be required to successively adjust attenuator and phase converter voltages to obtain maximum suppression.

Figure 7:
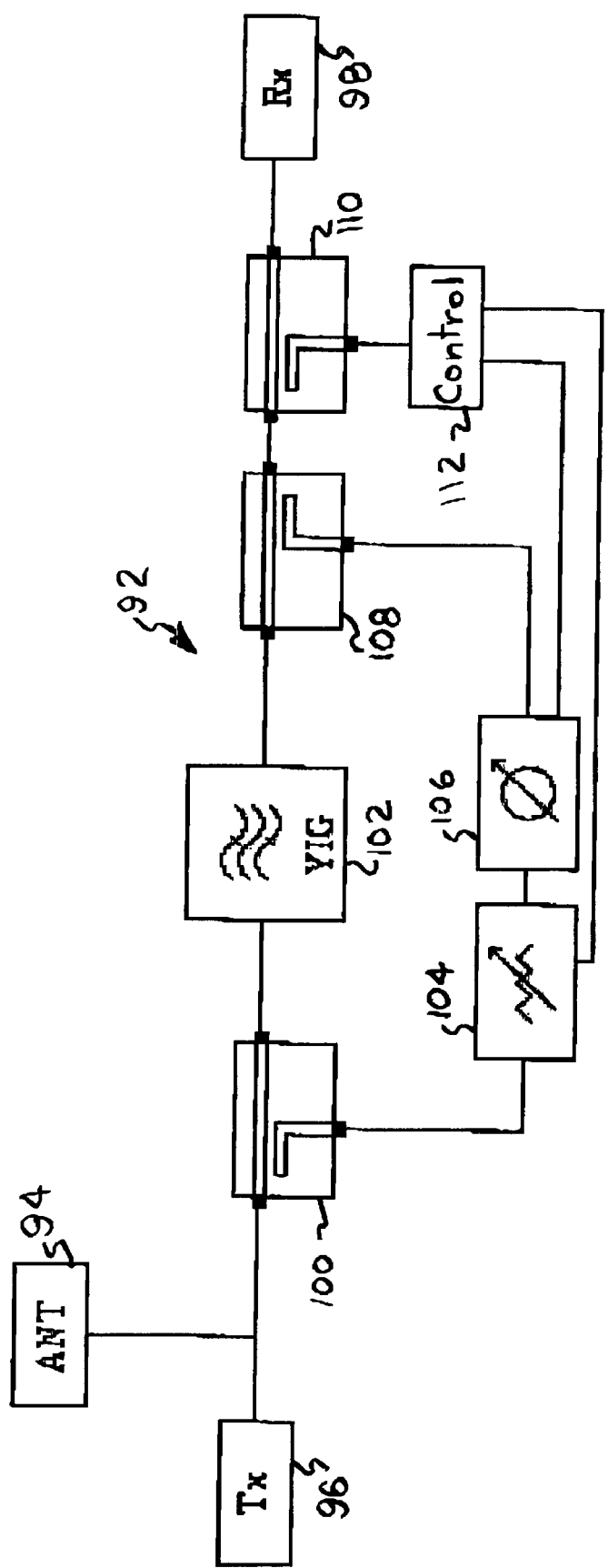
FIG. 7 is a block diagram of a communication system comprising a duplexer built in accordance with another embodiment of the invention.

Another embodiment could therefore include automated control of attenuator and phase-converter voltages as shown in FIG. 7. In this embodiment, an automated control unit 112 is placed at the output of the duplexer 92. The coupled signal (using coupler 110) is analyzed by, for example, a crystal detector. RF power is then convened to DC voltage in the control unit 112. Control unit 112 then optimizes the attenuator 104 and the phase-converter 106 in accordance with the previously obtained DC voltage. The remaining components in FIG. 7 (antenna 94, transmitter unit 96, receiver unit 98, couplers 100 an 108, and filter 102) arc similar to those described in FIG. 3.

In yet another embodiment, the phase-converter 106 has phase correction capabilities that are optimized for each frequency in the frequency of interest.

One of the possible applications for the technology described herein is the MMIC cellular technology. All passive components described herein can easily be made on a large scale basis.

The invention may be embodied in other specific forms without departing from its spirit or essential characteristics. The described embodiments are to be considered in all respects only as illustrative and not restrictive and the scope of the invention is, therefore, indicated by the appended claims rather than the foregoing description. All changes which come within the meaning and range of equivalency of the claims are to be embraced within their scope.

The invention claimed is:

1. A duplexer for a communication device having a transmission unit, a reception unit and a shared antenna, the duplexer comprising:

a transmitter port adapted to receive a transmission signal from the transmission unit;

a receiver port adapted to transmit a reception signal to the reception unit;

an antenna port adapted to transmit the transmission signal to the shared antenna and receive the reception signal from the shared antenna;

a first signal path between said transmitter port and said receiver port;

a filter unit in said first signal path for filtering said reception signal, said filter unit causing a leakage signal to occur between said transmitter port and said receiver port;

a second signal path between said transmitter port and said receiver port; and a cancellation unit in said second signal path adapted to receive a sample of the transmission signal and produce a compensation signal that is injected into the first signal path to substantially reduce the leakage signal.

2. The duplexer according to claim 1, wherein said cancellation unit comprises:

a. an attenuator for attenuating the sample of the transmission signal to an amplitude substantially equal to the amplitude of said leakage signal; and b. a phase-converter for shifting the phase of the transmission signal substantially 180-degree relative to the phase of the leakage signal.

3. The duplexer according to claim 1, further comprising a first coupling unit at a juncture between said first and second signal paths for injecting the compensation signal to the first signal path.

4. The duplexer according to claim 3, wherein said first coupling unit is located downstream from said filter unit.

5. The duplexer according to claim 4, wherein said cancellation unit comprises:
   a. an attenuator for attenuating the sample of the transmission signal to an amplitude substantially equal to the amplitude of said leakage signal; and
   b. a phase-converter for shifting the phase of the transmission signal substantially 180-degree relative to the phase of the leakage signal.

6. The duplexer according to claim 5, further comprising a second coupling unit at a juncture between said first and second signal paths for providing said sample of the transmission signal to said compensation unit.

7. The duplexer according to claim 6, wherein said filtering unit comprises a band-pass filter.

8. The duplexer according to claim 7, whereIn, said filtering unit comprises a YIG filter.

9. The duplexer according to claim 6, wherein the attenuation of said attenuator and the shifting of said phase-converter are variable according to a control voltage.

10. The duplexer according to claim 9, further comprising a third signal path between said first signal path and said compensation unit, said third signal path comprising a control unit receiving a sample of a substantially leakage-free reception signal and producing said control voltage for input to said compensation unit.

11. The duplexer according to claim 10, wherein said filtering unit comprises a band-pass filter.

12. The duplexer according to claim 11, wherein said filtering unit comprises a YIG filter.

13. A method for interfacing a transmission unit, a reception unit and a shared antenna within a duplexer, the method comprising:
   receiving at a transmitter port a transmission signal from said transmission unit;
   transmitting said transmission signal to said shared antenna via an antenna port;
   receiving a reception signal from said shared antenna via said antenna port;
   filtering said reception signal in a first signal path between said transmitter port and a receiver port, said filtering causing a leakage signal to occur between said transmitter port and said receiver port;
   sampling said transmission signal and computing a compensation signal having an amplitude substantially equal to the amplitude of said leakage signal and a phase substantially 180-degree shifted from the phase of the leakage signal; and
   injecting said compensation signal into said first signal path to be added to said reception signal and thereby substantially reduce said leakage signal.

14. The method of claim 13, further comprising controlling the amplitude and phase-shift of the compensation signal in accordance with a control voltage which is a function of a substantially leakage-free reception signal.

* * * * *